United States Patent

[11] 3,564,227

[72] Inventor Dan M. Bowers
Deer Park, N.Y.
[21] Appl. No. 690,452
[22] Filed Dec. 14, 1967
[45] Patented Feb. 16, 1971
[73] Assignee Potter Instrument Company, Inc.
Plainview, N.Y.

[54] COMPUTER AND ACCUMULATOR THEREFOR INCORPORATING PUSH DOWN REGISTER
16 Claims, 3 Drawing Figs.

[52] U.S. Cl. ........ 235/168; 340/172.5
[51] Int. Cl. ........ G06f 7/385
[50] Field of Search ........ 235/156, 168, 173, 175; 340/172.5

[56] References Cited
UNITED STATES PATENTS

| | | | |
|---|---|---|---|
| 3,234,524 | 2/1966 | Roth | 340/172.5 |
| 3,328,763 | 6/1967 | Rathbun et al. | 340/172.5 |

*Primary Examiner*—Malcolm A. Morrison
*Assistant Examiner*—James F. Gottman
*Attorney*—Lane, Aitken, Dunner & Ziems

ABSTRACT: This specification discloses a stored program digital computer, including an accumulator which also functions as a push down storage register. The first stage of the accumulator functions as a conventional accumulator adding or subtracting the binary numbers represented by applied signals from the numbers stored therein leaving the results of the addition or subtraction in the first stage. Also, the results of multiplication operations are stored in the first stage of the accumulator. When a number is transferred to the accumulator from the memory of the computer, it is stored in the first stage of the accumulator and the number that is stored in the first stage is shifted to the second stage of the accumulator. The binary numbers, if any, stored in the second and higher numbered accumulator stages are shifted to the next higher numbered accumulator stage. The binary numbers may be transferred from the first stage of the accumulator to the memory and when such a transfer is made, the numbers stored in the second and higher numbered accumulator stages are shifted to the next lower numbered accumulator stage. In addition, the accumulator can be controlled to add or subtract the contents of the second accumulator stage from the first accumulator stage. When such addition or subtraction takes place, the numbers stored in the third and higher numbered accumulator stages are each shifted to the next lower numbered accumulator stage.

INVENTOR
Dan M. Bowers
BY Lane, Aitken, Dunner & Ziems
ATTORNEYS

INVENTOR
Dan M. Bowers

BY
Lane, Aitken, Dunner & Ziems
ATTORNEY

COMPUTER AND ACCUMULATOR THEREFOR INCORPORATING PUSH DOWN REGISTER

BACKGROUND OF THE INVENTION

This invention relates to digital computers, and more particularly, to a digital computer with an improved accumulator, which reduces the number of operations and instructions directing such operations required to be carried out by the computer to solve a problem.

One component commonly used in computers in the performance of arithmetic operations is an accumulator, which normally stores the results of arithmetic operations, such as addition, subtraction or multiplication carried out by the computer. Most problems which a computer may be programmed to solve involve the arithmetic computation of intermediate results, which must be temporarily stored until they can be used to determine the final result of the problem. In computers of the prior art, these intermediate results are normally transferred from the accumulator to the main memory for storage necessitating program instructions directing these transfers. Since these transfers of data between the main memory and the accumulator are not actually part of the calculation process in solving a problem, these operations of the computer are referred to as redundant operations. It has been estimated that 30 percent of all operations of a computer are redundant in this sense. The system of the present invention is directed toward reducing these redundant operations by eliminating the need for transferring of intermediate results calculated by the computer to the main memory.

SUMMARY OF THE INVENTION

The elimination of the need for the transfer of intermediate results to the main memory is accomplished in the computer of the present invention by making the accumulator of the computer also function as a push down register. The accumulator is made up of a number of stages, each stage being capable of storing a binary word or number. The first stage of the accumulator functions as a conventional accumulator in all arithmetical operations of the computer. However, when a data word is transferred to the accumulator from the main memory of the accumulator, the binary word or number already stored in the first stage of the accumulator is automatically shifted to the second stage of the accumulator to make room for the number being transferred from the main memory. The numbers, if any, stored in the second and higher numbered stages of the accumulator are each shifted to the next higher numbered stage. Conversely, when a word is transferred from the first stage of the accumulator to the main memory, the binary word stored in the second and higher numbered accumulator stages are automatically each shifted to the next lower numbered accumulator stage. This arrangement makes possible the storage of intermediate results in the accumulator itself and thus eliminates the need to transfer these intermediate results to main memory, thus significantly reducing the number of data transfers between the main memory and the accumulator and the number of programmed instructions required to carry out the solving of a given problem.

Accordingly, an object of the present invention is to provide an improved computer.

Another object of the present invention is to provide an improved accumulator for a computer.

A still further object of the present invention is to reduce the number of operations required to be performed by a computer and the number of instructions required in a program required to solve a given problem.

A still further object of the present invention is to eliminate the need for the transfer of intermediate results to the main memory in the solving of a problem by a computer.

These and other objects of the present invention will become readily apparent as the following detailed description of the invention unfolds and when taken in conjunction with the drawings.

DESCRIPTION OF THE PREFERRED EMBODIMENT

Figure 1:
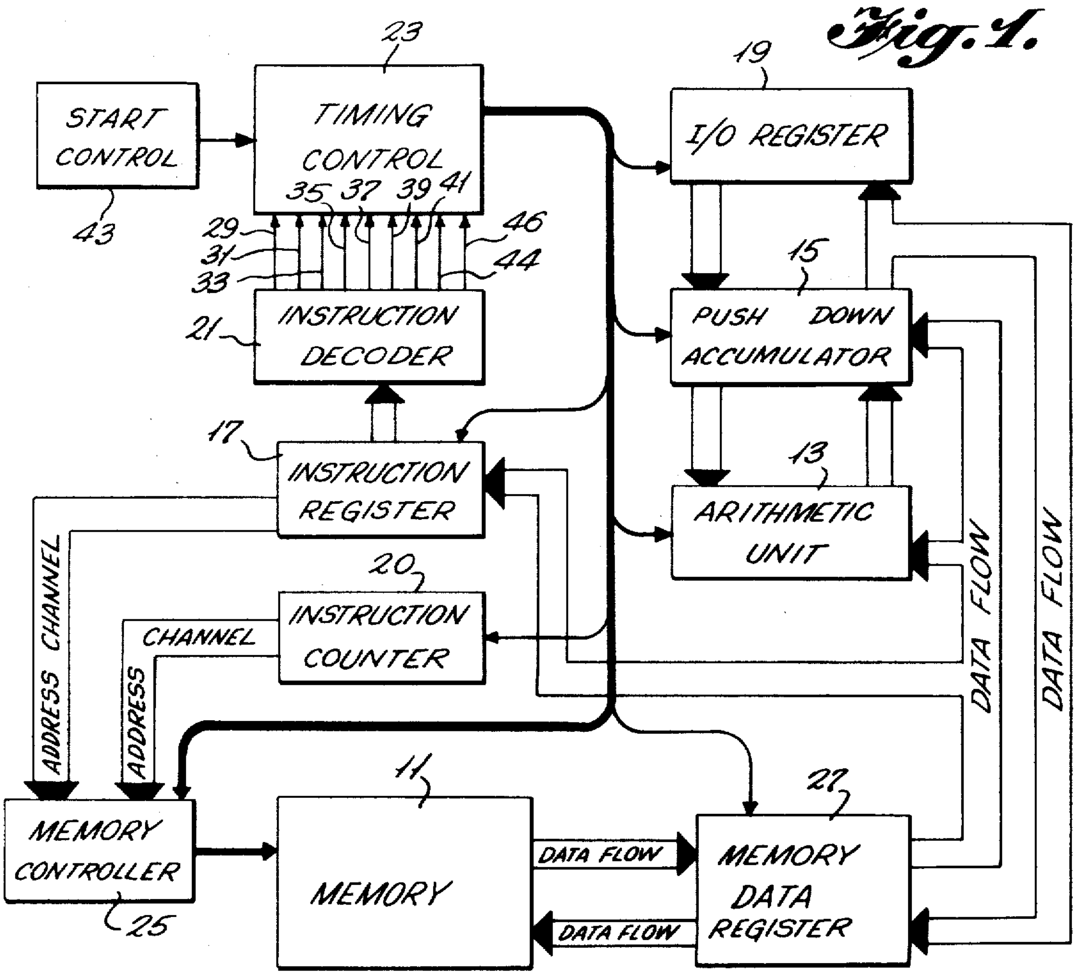
FIG. 1 is a block diagram illustrating the computer of the present invention.

As shown in FIG. 1, the computer of the present invention comprises a memory 11, an arithmetic unit 13 and an accumulator 15. The memory 11 stores binary coded words, which may be binary numbers or represent other data.

The sequence of operation of the computer is controlled by means of a stored program in the form of instructions stored in the memory 11. The instructions, which are represented by binary coded words, are read out from the memory in sequence to an instruction register 17. When an instruction is placed in the instruction register, the computer performs the operation directed by the instruction. Most of the instructions require the transfer of data to and from the memory and these instructions must also include an address representing the word location in the memory from or to which the data is to be transferred. For example, the instruction directing the transfer of a data word from the memory 11 to the accumulator 15 is LOAD and the address of the memory location from which the data is to be transferred must be included in the instruction LOAD. For convenience, an instruction including an address will be represented by the code word of the instruction immediately followed by the numerical address of the memory location. For example, the instruction requiring the transfer of data from memory location 123 in the memory unit 11 to the accumulator 15 is LOAD 123.

Table I below identifies by code word in the left-hand column typical instructions which can be performed by the computer of the present invention and defines in the right-hand column the function performed in response to the identified instruction, when the instruction is placed in the instruction register.

TABLE I

| Instruction | Description of computer operation |
|---|---|
| LOAD XXX | Nondestructively transfer the contents of memory location XXX into the Accumulator. |
| STORE XXX | Transfer the contents of the Accumulator to memory location XXX. |
| ADD XXX | Add the contents of memory location XXX to the Accumulator; result goes into the Accumulator; memory location XXX remains undisturbed. |
| SUB XXX | Subtract the contents of memory location XXX from the Accumulator, place the result in the Accumulator; memory location XXX undisturbed. |
| TIO | Transfer the contents of the Accumulator into the I/O Register. |
| TOI | Transfer the contents of the I/O Register into the Accumulator. |
| MULT XXX | Multiply the contents of memory location XXX by the Accumulator, place the result in the Accumulator; transfer from memory location XXX is nondestructive. |

The term "nondestructive" in the above descriptions means that after the transfer operation, the data is not only placed in the new location but also still remains in the old location.

The above instructions are just a few examples of the many instructions which can be performed by the computer. For purposes of simplification, only a few instructions are discussed in this specification. It will be understood that the computer of the present application will also be capable of performing other instructions conventional in computers and central processing units.

Binary signals representing the instruction in the instruction register 17 are applied to an instruction decoder 21. In response to these signals the instruction decoder 21 produces an output signal on the output line corresponding to the instruction in the instruction register 17. The output signal of the instruction decoder 21 is applied to a timing control unit 23 which in response to receiving the signal applies timing signals to the computer to cause the instruction to be carried out. After the instruction has been carried out the timing signal produces further timing signals to cause a new instruction to be read out of the instruction register so that the next instruction in the program can be carried out.

Each time a new instruction is read out of the memory unit 11, the timing control unit 23 will apply a signal to an instruction counter 20 to increase the count therein. The count in the instruction counter represents the address of the memory location from where the next instruction is to be retrieved.

The memory 11 is controlled by a memory controller 25, which receives signals representing the address stored with and forming part of the instruction stored in the instruction register. The memory controller also receives signals representing the count registered by the counter 20, which count as pointed out above will also be an address representing a location of a word in the memory 11. The memory controller 25 in response to signals applied from the timing control unit 23 will select a word location in the memory 11 corresponding to the address signals applied from the instruction register or corresponding to the address represented by the signals applied from the instruction counter and will either read the data out of the selected location or store data in the selected location. Memories and their controllers, such as described above, are well known in the art and their details will not be described here.

Transfer of data to or from the memory unit 11 is always transferred via a memory data register 27. When data is being transferred into the memory unit 11, the memory controller 25 in response to receiving a signal from the timing control unit 23 will transfer the data in the memory data register 27 to the location in the memory 11 represented by the address signals applied from the instruction register 17. When data is being transferred from the memory 11, the memory controller 25 in response to a signal from the timing control unit 23 will transfer to the memory data register 27 data from the location in the memory 11 represented by the address signals applied to memory controller 25 by the instruction register 17. When an instruction is being transferred out of the memory unit 11 to the instruction register 17, the memory controller 25 in response to signals from the timing control unit 23 will transfer to the memory data register 27 the instruction from the location represented by the address signals applied to the memory controller by the instruction counter 20.

The accumulator 15 in the system of the present invention as indicated in FIG. 1 is referred to as a push down accumulator. This name is given to the accumulator because it comprises several stages each capable of storing a binary word or number and words are shifted out of the first stage progressively into other stages when new words are stored in the first stage of the accumulator and are shifted from the other stages back into the first stage when words are transferred out of the accumulator to the memory. The accumulator will be described in more detail below.

When the instruction LOAD has been placed in the instruction register 17 calling for the word stored in a selected memory location to be stored in the accumulator, the instruction decoder 21 will produce an output signal on a channel 29. In response to the signal on channel 29, the timing control unit 23 will first apply a signal to the memory controller 25 to cause it to read out the word from the location represented by the address signals applied to the memory controller 25 from the instruction register 17. The word read out from memory will be stored in the memory data register 27. The signals applied to the memory controller 25 from the instruction register 17 will represent the address specified in the instruction LOAD. When a word is stored in the memory data register 27, signals representing this word will be applied to the accumulator 15 as well as to the arithmetic unit 13 and to the instruction register 17. After the timing control unit 23 has caused the memory controller 25 to read out a word from a selected location in the memory in response to the instruction LOAD, the timing control unit 23 will apply a signal to the accumulator 15 to cause it to store the word represented by the signals applied from the memory data register 27. In this manner, in response to the instruction LOAD, a word is read out of the location in the memory 11 specified by the address in the instruction and stored in the accumulator 15.

When the instruction STORE is registered in the instruction register 17, the instruction decoder 21 in response to the signals applied from the instruction register 17 will produce an output signal on a channel 31. In response to receiving this signal on channel 31, timing control unit 23 will first apply a signal to the memory data register 27. Signals representing the word stored in the first stage of the accumulator will be applied continuously to the memory data register 27. Thus, when the timing control unit 23 applies a signal to the memory data register 27, the word stored in the first stage of the accumulator 15 will be stored in the memory data register 27. After this operation, the timing control unit will apply a signal to the memory controller 25 to cause it to store the word stored in the memory data register 27 at the memory location represented by the address signals applied to the memory controller 25 from the instruction register 17. In this manner, the word stored in the first stage of the accumulator 15 is transferred to the selected memory location in the memory unit 11 in response to the instruction STORE.

When the instruction ADD is placed in the instruction register 17, the instruction decoder 21 in response to the applied signals representing the instruction ADD will produce an output signal on a channel 33 which will be applied to the timing control unit 23. In response to receiving this signal, the timing control unit 23 will first apply a signal to the memory controller 25 whereupon the memory controller 25 will read out the word stored at the memory location represented by the address signals applied to the memory controller 25 from the instruction register 17. In this manner, the word stored at the address specified in the instruction ADD will be transferred to the memory data register 27. Since the word read out from the selected memory location is in response to the instruction ADD, the word presumably will represent a binary number and signals representing this binary number will be applied by the memory data register 27 to the accumulator 15. The timing control unit 23 will then apply signals to the accumulator 15 to cause it to add the number represented by the signals applied to the accumulator from the register 27 to the number stored in the first stage of the accumulator 15 and to store the results of the addition in the first stage of the accumulator 15.

When the instruction SUB is stored in the register 17, the instruction decoder 21 in response to the applied signals representing this instruction will produce an output signal on a channel 35, which signal will be applied to the timing control unit 23. In response to receiving this signal, the timing control unit 23 will first apply a signal to the memory controller 25 to cause it to read out the number stored in the memory location represented by the address signals applied to the memory controller 25 from the instruction register 17 and store this number in the memory data register 27. Thereupon the timing control unit 23 will apply a signal to the accumulator 15 to cause the accumulator 15 to subtract the number represented by the signals applied to the accumulator 15 from the register 27 from the number stored in the first stage of the accumulator 15 and store the results of this subtraction in the accumulator 15. In this manner, in response to the instruction SUB, the numbers stored at the selected location in the memory 11 is subtracted from the number stored in the first stage of the accumulator 15.

When the instruction MULT is stored in the instruction register 17, the instruction decoder 21 will apply a signal on an output channel 37. In response to this signal, timing control 23 will first apply a signal to the memory controller 25 to cause the memory controller 25 to read out from the location in the memory 11 represented by the address signals applied to the memory controller 25 from the instruction register 17. Accordingly, the number stored at the memory location represented by the address in the instruction MULT in the instruction register 17 will be read out and stored in the memory data register 27. After this operation, the timing control unit 23 will apply a signal to the arithmetic unit 13, which in response to receiving the signal from the timing control unit 23 will multiply the number represented by the signals applied to the arithmetic unit 13 from the register 25 times the number represented by the signals applied to the arithmetic unit 13 from the accumulator 15. The accumulator 15 will continuously apply signals to the arithmetic unit 13 representing the numbers stored in the first stage of the accumulator 15. After the multiplication has been performed by the arithmetic unit 13, the arithmetic unit 13 will apply signals to the accumulator 15 representing the product of the multiplication performed by the arithmetic unit. After this multiplication has been performed and these signals are applied to the accumulator 15, the timing control unit 23 will apply a signal to the accumulator 15 to cause the accumulator 15 to store the product represented by the applied signals from the arithmetic unit 13 in the first stage of the accumulator 15. In this manner, the computer in response to the instruction MULT being stored in the instruction register 17, multiplies the number stored in the location selected by the address in the instruction times the number stored in the first stage of the accumulator 15 and will store the product of the multiplication in the first stage of the accumulator 15.

When the instruction TIO is stored in the instruction register 17, the instruction decoder 21 in response to the signals applied thereto from the instruction register 17 will produce an output signal on a channel 39. In response to receiving this signal, the timing control unit 23 will apply a signal to the IO register 19 to cause it to store the number represented by the signals applied to the IO register from the accumulator 15. The accumulator 15 will continuously apply signals to the IO register 19 representing the numbers stored in the first stage of the accumulator. Accordingly, in response to the instruction TIO being stored in the instruction register 17, the number stored in the first stage of the accumulator 15 will be transferred to the IO register 19.

When the instruction TOI is placed in the instruction register 17, the instruction decoder 21 will apply a signal over a channel 41 to the timing control unit 23, which in response to receiving this signal will apply a signal to the accumulator 15 and cause it to store in the first stage thereof the number of word represented by the signals applied to the accumulator from the IO register 19. The IO register 19 will continuously apply to the accumulator signals representing the number or word stored in the IO register. Thus, in response to the instruction TIO, the number or word stored in the IO register will be transferred to the first stage of the accumulator 15.

As pointed out above, the instructions representing a program of operations to be performed by the computer are stored sequentially in locations in the memory 11 corresponding to the sequence in which the instructions are to be performed in the program. To start the operation of the computer, the operator will first set the counter to a count representing the address of the first instruction of the program stored in the memory unit 11. He will then actuate a start control 43 causing it to apply a start signal to the timing control unit 23. In response to receiving this start signal the timing control 23 will apply a signal to the memory controller 25 to cause it to read out the word from the location represented by the signals applied to the controller 25 from the counter 20. Accordingly, the first instruction will be read out from the memory 11 to the register 27. The timing control 23 will then apply a signal to the instruction register 17 to cause it to store the instruction represented by the signals applied to the instruction register 17 from the register 27. The timing control 23 will then wait unit it receives a signal on one of the input channels from the instruction decoder 21. When it receives such a signal the timing control 23 will then apply signals to the various units as described above to cause the instruction placed in the instruction register 17 to be carried out. While the timing control unit 23 is performing this function, it will also apply a pulse to the counter 20 to cause the count in the counter 20 to be increased by one. After the timing control unit 23 has caused the instruction in the instruction register to be carried out, the timing control unit 23 will apply another signal to the memory controller 25 to cause the memory controller 25 to again read out the instruction from the location represented by the signals applied from the instruction counter 20. Accordingly, the next instruction in the program will be read out from the memory 11 to the register 27. After the instruction is read out to the register 27, the timing control unit 23 will again apply a signal to the instruction register 17 to cause it to receive the instruction represented by the signals applied thereto whereupon this instruction will be carried out. The operation will precede in this manner until all the instructions in the program have been carried out and in this manner the computer will be controlled to perform the desired program.

The instruction register may also be controlled directly by the operator to alternately register the instructions TOI and STORE so that a program of instructions may be fed from the IO register into the memory 11. In such an operation, the STORE instructions will contain addresses in increasing sequence so that the instructions are placed in sequential locations in the memory 11.

Instruction decoders, timing control units and instruction counters as described above are well known in the art and accordingly their circuitry will not be described in detail. Likewise, arithmetic units as described above are well known in the art and will not be described in detail. The accumulator of the present invention however as pointed out above is unique and accordingly its details are described below with reference to FIGS. 2 and 3.

Figure 2:
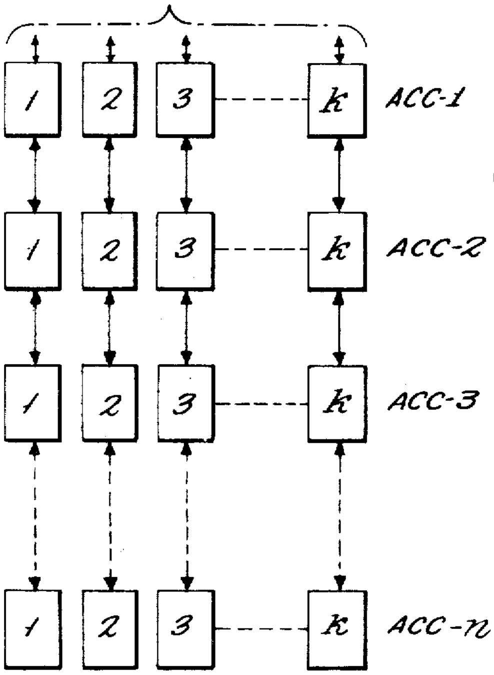
FIG. 2 is a block diagram illustrating the accumulator used in the computer of the present invention.

As pointed out above, the accumulator of the system of the present invention has a plurality of stages, which are designated in FIG. 2 as ACC–1, ACC–2, ACC–3 and up to ACC–$n$ representing $n$ accumulator stages. Each accumulator stage is made up of a number of orders each storing a binary bit or digit. As illustrated in FIG. 2, each stage of the accumulator of the present invention has $k$ orders. The first order of the accumulator stores the least significant digit in the binary number stored in the accumulator stage. The second and third orders of each accumulator stage store the second and third least significant digits of the binary number stored in the stage. The highest significant digit is stored in the highest or $k$th order of the accumulator stage. The first stage ACC–1 of the accumulator in response to the instructions ADD, SUB, MULT, TOI and TIO acts as a conventional accumulator performing the operations corresponding to these instructions in response to signals from the timing control unit 23 as described above. The orders of the accumulator stages are connected into a plurality of shift registers equal to the number of orders in each stage or in other words $k$ shift registers. Each shift register consists of $n$ corresponding orders, one in each accumulator stage, with an order in the first stage of the accumulator being the first stage of the shift register, a corresponding order in the second stage of the accumulator being the second stage of the shift register, etc. In response to signals applied to the accumulator by the timing control unit 23 generated in response to the instruction LOAD, the shift registers of the accumulator are shifted so that the words already stored in the accumulator are shifted to a higher designated accumulator stage to make room for the word being transferred to the first stage of the accumulator from the memory 11. Thus, in response to the instruction LOAD, the word stored in the first stage of the accumulator will be transferred to the second stage, the word stored in the second stage will be transferred to the third stage, etc. In response to signals applied to the accumulator from the timing control unit 23 generated in response to the instruction STORE, the words stored in each stage of the accumulator will be shifted to the next lower designated stage with the word stored in the first stage being transferred to the memory 11 as described above. Thus, the word stored in the second stage of the accumulator will be transferred to the first stage, the word stored in the third stage will be shifted to the second stage, etc.

In addition to the above described instructions, the computer of the present invention will also carry out two additional instructions identified by the code words ADDACC and SUBACC. In response to the instruction ADDACC being placed in the instruction register, the instruction decoder will produce an output signal on a channel 44. In response to this signal, the timing control unit will apply signals to the accumulator to cause the accumulator to add the number stored in the second stage ACC–2 of the accumulator to the number stored in the first stage ACC–1 with the resulting sum stored in the first stage. In addition, the numbers stored in the higher number accumulator stages ACC–3 through ACC–*n* are all caused to be shifted to the next lower numbered accumulator stage. In response to the instruction SUBACC being placed in the instruction register, the instruction decoder will produce an output signal in an output channel 46. The timing and control unit in response to receiving a signal on channel 46 will apply signals to the accumulator to cause it to subtract the number stored in the second stage ACC–2 of the accumulator from the number stored in the first stage ACC–1. In addition, the numbers stored in the higher numbered accumulator stages ACC– 3 through ACC–*n* will be shifted to the next lower numbered accumulator stage.

The advantage of the above arrangement is that it eliminates steps of transferring data back and forth between the accumulator and the memory and therefore eliminates the instructions required for such transfers. As an example, let it be assumed that it is desired for the computer to determine the quantity *y* from the following equation:

$$y = ax_1^3 + bx_2^2 + cx_3 + d$$

Let is be assumed also that the constants *a*, *b*, *c* and *d* are stored in memory locations 001, 002, 003 and 004 respectively, and that the observed quantities $x_1$, $x_2$ and $x_3$ are stored in memory locations 005, 006 and 007 respectively. Let it further be assumed that the computed quantity *y* is to be sent to the I/O register after it is computed. If the accumulator were a conventional accumulator having only one stage, the program of instructions given in Table II below would be required to solve the above equation.

TABLE II

| Instruction | Description |
|---|---|
| LOAD 007 | get $x_3$ from memory into ACC. |
| MULT 003 | multiply $x_3$ by c. $c \cdot x_3$ is in ACC. |
| STORE 008 | store $c \cdot x_3$ in 008. |
| LOAD 006 | fetch $x_2$ to ACC. |
| MULT 006 | multiply $x_2$ by $x_2$. $x_2^2$ is in ACC. |
| MULT 002 | multiply $x_2^2$ by b. $bx_2^2$ is in ACC. |
| STORE 009 | store $bx_2^2$ in 009. |
| LOAD 005 | fetch $x_1$ to ACC. |
| MULT 005 | multiply $x_1$ by $x_1$. $x_1^2$ is in ACC. |
| MULT 005 | multiply $x_1^2$ by $x_1$. $x_1^3$ is in ACC. |
| MULT 001 | multiply $x_1^3$ by a. $ax_1^3$ is in ACC. |
| ADD 009 | Add $bx_2^2$ to $ax_1^3$. $ax_?^3+bx_3^2$ is in ACC. |
| ADD 008 | Add $cx_3$ to ACC. $ax_1^3+bx_2^2+cx_3$ is in ACC. |
| ADD 004 | Add d to ACC. $ax_1^3+bx_2^2+cx_3+d$ is in ACC. |
| TIO | send answer $y=ax_1^3+bx_2^2+cx_3+d$ to I/O Reg. |

In the program in Table II, the instructions are listed in their sequence to be performed in the left-hand column and the operations performed by the computer in response to the instructions are explained in the right-hand column. From Table II, it will be seen that 15 instructions are required with five of the instructions either being LOAD or STORE, merely directing transfer of data between the accumulator and the memory.

When the above equation is solved with the computer of the present invention, with the push-down accumulator, the program of instructions given in Table III below is required.

TABLE III

| Instruction | ACC 1 contents | ACC 2 contents | ACC 3 contents |
|---|---|---|---|
| LOAD 007 | $x_3$ | ------------ | |
| MULT 003 | $cx_3$ | ------------ | |
| LOAD 006 | $x_2$ | $cx_3$ | |
| MULT 006 | $x_2^2$ | $cx_3$ | |
| MULT 002 | $bx_2^2$ | $cx_3$ | |
| LOAD 005 | $x_1$ | $bx_2^2$ | $cx_3$ |
| MULT 005 | $x_1^2$ | $bx_2^2$ | $cx_3$ |
| MULT 005 | $x_1^3$ | $bx_2^2$ | $cx_3$ |
| MULT 001 | $ax_1^3$ | $bx_2$ | $cx_3$ |
| ADD ACC | $ax_1^3+bx_2^2$ | $cx_3$ | |
| ADD ACC | $ax_1^3+bx_2^2$ $+cx_3$ | ------------ | |
| ADD 004 | y | ------------ | |
| TIO | ------------ | ------------ | |

As indicated in the headings of the columns in Table III, the left-hand column again gives the required instructions in the sequence in which they are to be carried out. The other columns in Table III give the contents of the accumulator stages ACC–1, ACC–2 and ACC–3 after the instruction in the same line in the left-hand column has been carried out. It will be noted that the number of LOAD and STORE instructions has been reduced to three thus reducing the total number of instructions required to carry out the computation of *y* to 13. Thus, the system of the present invention significantly reduces the number of operations required to be carried out by the computer and the number of instructions required to carry out a given calculation.

Figure 3:
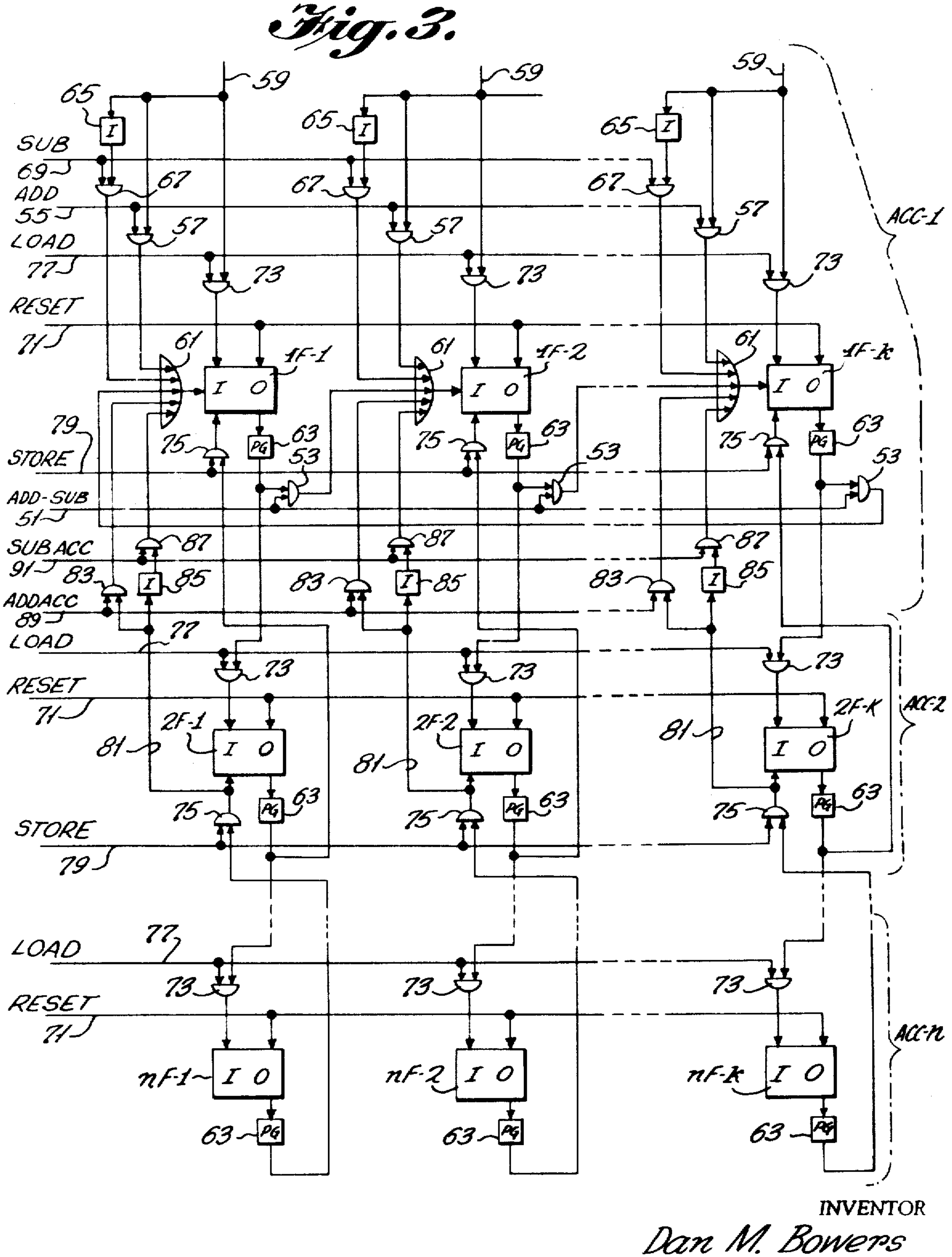
FIG. 3 is a block diagram illustrating the detailed logic circuitry of the accumulator of the present invention.

The detailed logic circuitry of the push-down accumulator of the present invention is illustrated in FIG. 3. The first stage of the accumulator as shown in FIG. 3, comprises a plurality of flip-flops 1F–1 through **1F–*k***, one for each order of the accumulator stage. The other stages of the accumulator also contain one flip-flop in each order. The flip-flops which comprise the *l*st through *k*th orders of the second accumulator stage are designated 2F–1 through **2F–*k*** respectively. The flip-flops which comprise the *l*st through *k*th orders of the *n*th accumulator stage are designated *n*F–1 through *n*F–*k* respectively. The flip-flops of the *l*st accumulator stage are interconnected to operate like a conventional accumulator when a binary number is being added or subtracted to the contents of the first stage.

When a binary number is being added to the first stage in response to the instruction ADD, the timing and control unit will apply a gating signal to an input line 51 to enable an AND gate 53 in each order of the first stage for the duration of the adding operation. The timing and control circuit will also apply a pulse to an input line 55 to momentarily enable an AND gate 57 in each order of the first stage of the accumulator. Input signal lines 59 carrying the signals representing the data from the memory data register 27 are applied severally to the gates 57 with each binary signal being applied to the order corresponding to the order of the binary signal being applied to the order corresponding to the order of the binary digit represented by the signal. Thus, the signal representing the least significant digit will be applied to the first order of the first accumulator stage; the signal representing the second least significant digit will be applied to the second order of the first accumulator stage of the accumulator; and the signal representing the most significant digit will be applied to the *k*th order of the first accumulator stage. Upon the pulse being applied to the line 55 by the timing control unit, each gate 57 which is connected to an input signal line 59 on which a signal is applied representing a binary one will produce an output pulse. This output pulse will pass through an OR gate 61 in the corresponding order of the first accumulator stage to be applied to the flip-flop of the order and switch the flip-flop to the opposite state.

When anyone of the flip-flops is switched from the state in which it stored a binary one, referred to hereinafter as the one state of the flip-flop, to the state in which it represents the storing of a binary zero, referred to hereinafter as the zero state of the flip-flop, the flip-flop will apply a signal to a pulse generator 63 in the same order of the first accumulator stage, which pulse generator will produce an output pulse after a slight delay. The output pulses of the pulse generators 63 are applied to the gates 53, which will be enabled by the signal applied on input line 51 during an addition operation. The output pulses accordingly will pass through the gates 53 whereupon they each will be applied to the OR gate 61 in the next higher order of the first accumulator stage ACC–1. Each pulse will then pass through this OR gate of the next higher order to the flip-flop of the next higher order and switch the flip-flop to its opposite state. In this manner, carries resulting from the binary addition are transmitted from order to order during an adding operation in the first stage of the accumulator.

The *k*th order of the first stage of the accumulator also has a pulse generator 63 which will produce an output pulse a slight delay after the flip-flop of the *k*th order has been switched from its one state to its zero state; and the output pulse produced by the pulse generator 63 in the *k*th order is also applied to the AND gate 53 of the *k*th order. The output of the AND gate 53 in the *k*th order is applied to the OR gate 61 in the first order of the first accumulator stage. Accordingly, when the flip-flop in the *k*th order of the first accumulator stage switches from its one state to its zero state, while the gates 53 are enabled, the resulting pulse produced by the pulse generator 63 in the *k*th order will be applied through the OR gate 61 in the first order to switch the flip-flop of the first order to the opposite state. The purpose of this circuitry is to provide what is called an end around carry, meaning that carries from the *k*th order are added to the first order. The end around carry is needed for the subtraction operation, which is carried out by first providing signals representing the complement of the binary number to be subtracted from the number in the first stage of the accumulator. The complement of the binary number represented by the signals applied on the input channels 59 is generated by applying each of the input signals on input channel 59 to an inverter 65. The output signal of each inverter will represent a binary zero if the applied input signal from the corresponding channel 59 represents a binary one and vice versa. Accordingly, the output signals of the inverter 65 are applied to AND gates 67, the outputs of which are applied to the OR gates 61. When the number represented by the signals applied on input channels 59 is to be subtracted from the binary number stored in the first stage of the accumulator as would be directed by the instruction SUB, the AND gates 67 will be momentarily enabled by a pulse applied thereto on input channel 69 from the timing control unit. As a result, pulses will be applied to switch the states of the flip-flops in those orders of the first accumulator stage in which the output signals of the inverters 65 represent binary ones or in other words, those orders in which the applied signals on channels 59 represent binary zeros. The timing control unit will also apply an enabling signal to the AND gates 53 in each order over input channel 51 while the subtraction process is being carried out. Accordingly, the first stage of the accumulator will add the complement of the binary number represented by the signals applied on input channels 59 to the number already stored in the first stage of the accumulator and in this manner a subtraction of the number represented by the applied signals from the number stored in the first stage of the accumulator is carried out.

When a LOAD or STORE instruction is being carried out, the timing and control unit first applies a pulse to a reset channel 71 in each accumulator stage. The pulses applied to the reset channels reset all of the flip-flops which are in their one states back to their zero states. The flip-flops which are in their zero states remain in the zero state. The orders of each of the additional accumulator stages ACC–2 through ACC–*n* also each have a pulse generator 63 which in response to the flip-flop of the order being switched from its one state to the zero state will produce an output pulse after a slight delay. The output pulses of each pulse generator 63 are applied to an AND gate 73 in the corresponding order of the next higher numbered accumulator stage and are applied to an AND gate 75 in the corresponding order of the next lower numbered accumulator stage.

When a LOAD instruction is being carried out, the timing and control unit will apply enabling signals to input channels 77 to enable the AND gate 73 in each of the accumulator stages. When in a LOAD operation a flip-flop is reset from its one to its zero stage as a result of the reset signal applied to the channel 71, the pulse generator 63 in the same order will produce an output pulse which will pass through the AND gates 73 in the corresponding order of the next higher numbered accumulator stage and set the flip-flop of this order to its one state. In this manner, in response to the LOAD instruction, the binary numbers stored in the accumulator stages are shifted to the next higher numbered accumulator stage. AND gates 73 in each of the orders of the first accumulator stage are also enabled while a LOAD instruction is being carried out. These gates 73 are connected severally to receive the signals on input channels 59 and when enabled will pass the signals to the flip-flops of the first accumulator stage after the flip-flops have been reset to zero. Those signals on channels 59 which represent binary ones will set the flip-flops to which they are applied to their one states so that the binary word represented by the applied signals will be registered in the first accumulator stage.

When a STORE instruction is being carried out, the timing and control unit in addition to applying reset signals to the reset input channels 71, also will apply enabling signals to input channels 79 to enable AND gate 75 in each accumulator stage but the *n*th accumulator stage which does not have the AND gates 75. When in carrying out a STORE instruction, one of the flip-flops in the accumulator stages ACC–2 through ACC–*n* is switched from its one state to its zero state causing the pulse generator 63 in the same order to produce an output pulse, this output pulse will pass through the enabled AND gates 75 in the corresponding order in the next lower numbered accumulator stage and will switch the flip-flop in this order to its one state. In this manner, in response to the STORE instruction, the binary numbers stored in the accumulator stages ACC–2 through ACC–*n* are shifted to the next lower numbered accumulator stage.

Signals representing the binary number stored in the second accumulator stage ACC–2 are continuously applied over channels 81 to AND gates 83 and inverters 85 in the first stage of the accumulator. The output signals of the inverters 85 represent the complement of the binary number stored in the second accumulator stage and are applied to AND gates 87. When the instruction ADDACC is placed in the instruction register, the timing control unit will apply a pulse over channel 89 to all of the AND gates 83 to momentarily enable them so that pulses will pass through those AND gates 83 which receive signals from the second accumulator stage representing binary ones. These pulses will pass through the OR gates 61 in the same order to switch the flip-flops of these orders to the opposite state. The timing control unit will also apply an enabling signal to AND gates 53 over channel 51. Accordingly, the number stored in the second accumulator stage will be added to the number stored in the first stage. The timing control unit will also apply enabling signals to AND gates 75 in accumulator stages ACC–2 through ACC–$n-1$ over input channels 79. The gates 75 in the first accumulator stage are not enabled. The timing and control unit then applies pulses to reset lines 71 in all but the first accumulator stage to reset the flip-flops in the second through *n*th stages to zero. As a result, the pulse generators 63 in those orders of the second through *n*th accumulator stages which store ones will produce output pulses and those pulses from orders in the third through *n*th stages of the accumulator will pass through the AND gates in corresponding orders in the next higher numbered accumulator stages to set the flip-flops in these corresponding orders to their one states. In this manner, the binary numbers stored in the third through *N*th accumulator stages are each shifted to next lower numbered stages in response to the instruction ADDACC.

When the instruction SUBACC is placed in the instruction register, the timing control unit will apply a pulse to an input channel 91 to enable the AND gates 87. Those AND gates 87 which receive signals from inverters 85 representing binary ones will produce output pulses, which are applied through OR gates 61 to switch the flip-flops in the same accumulator orders to the opposite state. The timing control unit will also apply an enabling signal to AND gates 53 over channel 51. Accordingly, the number stored in the second accumulator stage will be subtracted from the number stored in the first accumulator stage. As in the carrying out of the ADDACC instruction, the timing control unit also applies enabling signals to AND gates 75 over input channels 75 in the second through ($n$−1)th accumulator stages and then resets all of the flip-flops in the second through *n*th stages to shift each of the binary numbers in the third through *n*th stages to the next lower numbered accumulator stage.

The interconnections to the first stage of the accumulator for transmitting words to the memory data register and to the IO register and for receiving data from the IO register and from the arithmetic unit have been left out of FIG. 3 for purposes of simplification. Since these interconnections are obvious, it is not deemed necessary to show them in detail in FIG. 3.

The above description is of a preferred embodiment of the invention and many modifications may be made thereto without departing from the spirit and scope of the invention, which is defined in the appended claims.

I claim:

1. A computer comprising a memory capable of storing a plurality of numbers, an accumulator including first through *n*th stages each capable of storing a number and including means to perform arithmetic operations on the number stored in the first accumulator stage, and means to transfer numbers between said memory and the first stage of said accumulator, said accumulator including means operable upon the transfer of a number from the first accumulator stage to said memory to shift the numbers if any stored in the second through *n*th accumulator stages to the first through ($n$−1)th accumulator stages respectively, and operable when a number is being transferred from said memory to the first accumulator stage to shift the numbers if any stored in the first through ($n$−1)th stages of said accumulator to the second through *n*th accumulator stages respectively.

2. A computer as recited in claim 1 wherein said accumulator includes means to add the number stored in the second accumulator stage to the contents of the first accumulator stage with the result being stored in the first accumulator stage.

3. A computer as recited in claim 2 wherein said accumulator includes means operable upon the adding of the number stored in the second accumulator stage to the contents of the first accumulator stage to shift the numbers stored in the third through *n*th accumulator stages to the second through ($n$−1)th accumulator stages respectively.

4. A computer as recited in claim 2 wherein said computer includes means to subtract the number stored in the second accumulator stage from the contents of the first accumulator stage with the result stored in the first accumulator stage.

5. A computer as recited in claim 4 wherein said accumulator includes means operable when the number stored in the second accumulator stage is added or subtracted from the contents of the first accumulator stage to shift the numbers stored in the third through *n*th accumulator stages to the second through ($n$−1)th accumulator stages respectively.

6. A computer as recited in claim 1 wherein said means to perform arithmetic operations on the number stored in said first accumulator stage comprises means to add a number transferred from said memory to the contents of the first accumulator stage with the result stored in said first accumulator stage.

7. A computer as recited in claim 6 wherein said means to perform arithmetic operations on the number stored in the first accumulator stage further comprises means to subtract a number transferred from said memory to the first accumulator stage with the results stored in the first accumulator stage.

8. A computer as recited in claim 7 wherein said computer includes means to multiply a number transferred from said memory times the number stored in the first accumulator stage with the results of the multiplication being stored in said first accumulator stage.

9. A computer as recited in claim 1 including means to control said accumulator, said memory, and said means to transfer data between said accumulator and said memory to perform operations, including arithmetic operations and the transfer of data between said memory and said accumulator, in a selected sequence.

10. An accumulator comprising first through *n*th stages each capable of storing a binary number, each of said stages comprising a plurality of orders each capable of storing a binary digit, each of said orders comprising a bistable storage unit having first and second stable states and storing binary ones and zeros by being in said first and second stable states respectively, means to perform arithmetic operations on the binary number stored in the first stage, means to transfer binary numbers to and from said first stage, and means operable upon the transfer of a binary number from the first stage to shift the binary numbers, if any, stored in the second through *n*th stages to the first through ($n$−1)th stages respectively and operable when a binary number is being transferred to the first stage to shift the binary numbers, if any, stored in the first through ($n$−1)th stages to the second through *n*th stages respectively.

11. An accumulator as recited in claim 10 and further comprising means to add the numbers stored in the second stage to the contents of the first stage with the result being stored in the first stage.

12. An accumulator as recited in claim 11 and further comprising means operable upon the adding of the number stored in the second stage to the contents of the first stage to shift the numbers stored in the third through *n*th stages to the second through ($n$−1)th stages respectively.

13. An accumulator as recited in claim 11 and further comprising means to subtract the number stored in the second stage from the contents of the first stage with the result being stored in the first stage.

14. An accumulator as recited in claim 13 and further comprising means operable when the number stored in the second stage is added or subtracted from the contents of the first stage to shift the binary numbers stored in the third through *n*th stages to the second through ($n$−1)th stages respectively.

15. A computer as recited in claim 1 wherein said stages of said accumulator each comprise a plurality of orders each capable of storing a binary digit, each of said orders comprising a bistable storage unit having first and second stable states and storing binary ones and zeros by being in said first and second stable states respectively.

16. An accumulator comprising first through *n*th stages each capable of storing a binary number, means to transfer binary numbers from a source to and from said first stage, means operable upon the transfer of a binary number from the first stage to shift the binary numbers, if any, stored in the second through *n*th stages to the first through ($n$−1)th stages respectively and operable when a binary number is being transferred to the first stage to shift the binary numbers, if any, stored in the first through $(n-1)$th stages to the second through $n$th stages respectively, and means selectively operable in a first mode to add the binary number in said second stage to the contents of said first stage and to store the results of the addition in said first stage and selectively operable in a second mode to receive signals representing any selected binary number from said source and to selectively add or subtract said selected binary number directly to or from the binary number in said first stage and to store the results of the addition in said first stage, and means operable upon adding in said first mode the number stored in said second stage to the contents of said first stage to shift the number stored in the third through $n$th stages to the second through $(n-1)$th stages respectively.